(12) United States Patent
Frisch

(10) Patent No.: US 6,505,851 B2
(45) Date of Patent: *Jan. 14, 2003

(54) GAS BAG RESTRAINT DEVICE

(75) Inventor: Ralph Frisch, Mömbris (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/903,850

(22) Filed: Jul. 12, 2001

(65) Prior Publication Data

US 2002/0005637 A1 Jan. 17, 2002

(30) Foreign Application Priority Data

Jul. 13, 2000 (DE) ........................... 200 12 077 U
Dec. 28, 2000 (DE) ........................... 100 65 462

(51) Int. Cl.$^7$ ........................... B60R 21/16; B60R 21/20
(52) U.S. Cl. ................. 280/728.3; 280/728.2; 280/731; 280/743.1
(58) Field of Search ............................. 280/731, 743.1, 280/728.3, 728.2

(56) References Cited

U.S. PATENT DOCUMENTS

| | | | | |
|---|---|---|---|---|
| 3,618,979 A | * | 11/1971 | Gulette | 280/731 |
| 3,819,203 A | * | 6/1974 | Radke et al. | 280/731 |
| 4,828,286 A | * | 5/1989 | Fohl | 280/728.2 |
| 5,125,682 A | * | 6/1992 | Hensler et al. | 280/730.1 |
| 5,480,184 A | * | 1/1996 | Young | 280/728.3 |
| 6,042,147 A | * | 3/2000 | Nishijima et al. | 280/731 |

FOREIGN PATENT DOCUMENTS

| | | | |
|---|---|---|---|
| DE | 3145731 A1 | * | 5/1983 |
| DE | 197 49 914 A1 | * | 5/1999 |
| GB | 2 268 128 A | * | 1/1994 |
| WO | WO 97/34783 | * | 9/1997 |

* cited by examiner

Primary Examiner—Paul N. Dickson
Assistant Examiner—Ruth Ilan
(74) Attorney, Agent, or Firm—Tarolli, Sundheim, Covell, Tummino & Szabo L.L.P.

(57) ABSTRACT

A gas bag restraint device for restraining an occupant comprises a gas bag module, which has a gas generator and a gas bag with a gas bag wall. The gas bag wall has a front wall facing the occupant, which front wall has a center section with a depression, in relation to an inflated state of the gas bag, so that an annular gas bag chamber surrounding the depression is formed. The device further comprises a module covering which on inflation of the gas bag opens an outlet opening, and a fastening device for the center section, with which the center section is prevented from a movement out of the gas bag module even in the inflated state of the gas bag, so that the depression is formed. The fastening device includes a reinforcement insert integrated into the module covering and fastened to the gas bag module.

14 Claims, 3 Drawing Sheets

GAS BAG RESTRAINT DEVICE

TECHNICAL FIELD

The invention relates to a gas bag restraint device for restraining an occupant of a vehicle.

BACKGROUND OF THE INVENTION

A gas bag restraint device known from DE 197 49 914 A1 has a so-called annular gas bag, a so-called guide sleeve being arranged in the center of the gas bag module. The gas bag has a gas bag wall, said wall having a front wall with respect to the inflated state which faces the occupant who is to be restrained and which is the part of the gas bag which is moved most forward towards the occupant. The front wall comprises a ring shaped outer portion, which is to be contacted by the occupant, and a center section with a depression. The center section is surrounded by the ring shaped outer portion. A guide sleeve is firmly connected on the rear face with the gas bag module base and is firmly connected on the front face with the module covering. On opening of the module covering, a central section of the module covering remains. Also a fastening device with a separate nut and a cover which makes the nut invisible externally, is shown.

BRIEF SUMMARY OF THE INVENTION

The invention provides a gas bag restraint device in which the fastening device is constructed more simply than. in the prior art, requires less space and the construction of the module covering can be designed so as to be less complicated. The gas bag restraint device according to the present invention comprises a gas bag module, which has a gas generator and a gas bag with a gas bag wall. The gas bag wall has a front wall facing the occupant, which front wall has a center section with a depression, in relation to an inflated state of the gas bag, so that an annular gas bag chamber surrounding the depression is formed. The device further comprises a module covering which on inflation of the gas bag opens an outlet opening, and a fastening device. for the center section, with which the center section is prevented from a free movement, preferably from any movement, out of the gas bag module even in the inflated state of the gas bag, so that the depression is formed. The fastening device comprises a reinforcement insert integrated into the module covering and fastened to the gas bag module.

The reinforcement insert, as stated, is integrated into the module covering by having been placed into the foaming or injection mold during the foaming or injection-molding of the module covering. The module covering therefore remains in the region of the center section on opening, and only the adjoining part folds outwards in order to open the outlet opening. Problems in connecting the fastening device to the module covering do not occur.

According to the preferred embodiment, the reinforcement insert is a metal sheet.

Holding pieces, such as threaded bolts, sheet metal tongues, rivet bolts or sections of a bayonet closure for example can project from the sheet metal insert, which protrude from the module covering and via which the fastening device is arrested on the module. The threaded bolts are, for example, bolted, the sheet metal tongues are bent over, the rivet bolts are tumble-riveted, and the bayonet closure is closed, in order to arrest the module covering together with the center section permanently on the module.

The arresting takes place for example immediately on the gas generator, more precisely on the gas generator housing. Here, the center section is gripped between the front end wall of the gas generator and the module covering.

According to another embodiment, the reinforcement insert is fastened to a cup-shaped diffusor which is turned over the gas generator, or to a component surrounding the gas generator, e.g. a bracket. Here, the center section is gripped between the front end wall of the diffusor and the module covering.

DETAILED DESCRIPTION OF PREFERRED EMBODIMENTS

Figure 1:
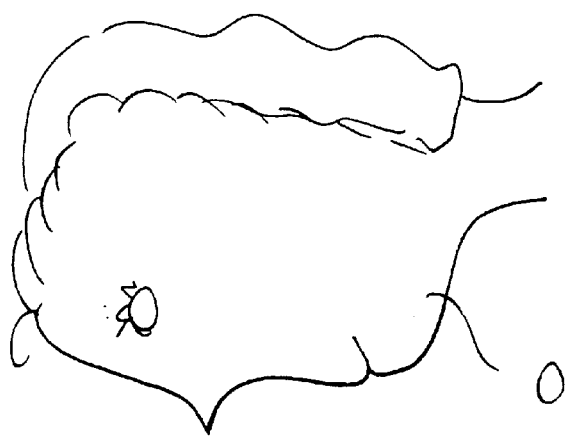
FIG. 1 shows a longitudinal sectional view through a gas bag restraint device according to the invention, which is integrated into a vehicle steering wheel.
Figure 1:
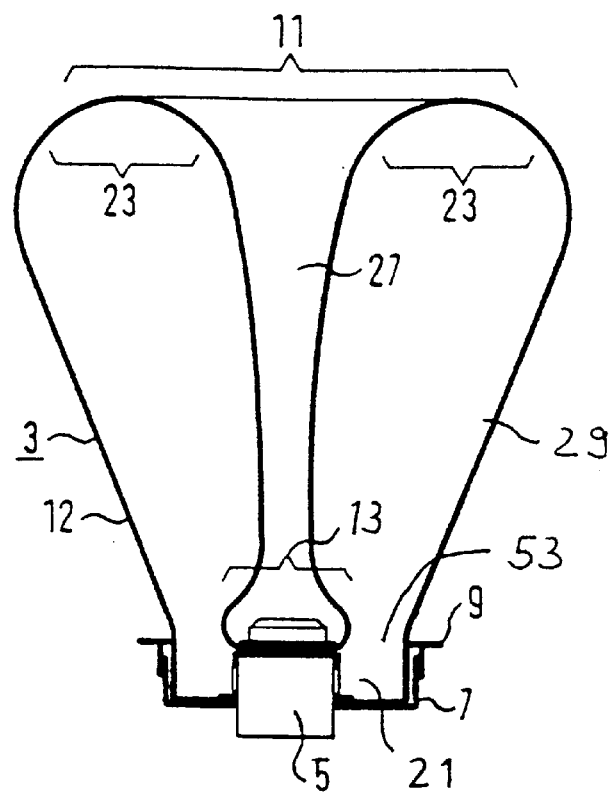

In FIG. 1 a gas bag restraint device with a gas bag module is shown, which device is housed in the vehicle steering wheel or in the instrument panel on the passenger side, serving to restrain the head and upper body. The gas bag module has a gas bag 3, a gas generator 5, a module housing 7, in which the gas bag 3 and the gas generator 5 are housed, and a module covering 9.

The gas bag consists of a gas bag wall of fabric material, with a front wall 11, which faces the occupant in the inflated state and which is contacted by the occupant. In addition, a rear wall 12 is provided, which can consist of a separate fabric piece which has an inlet opening 21 via which the gas generator 5 is introduced into the gas bag 3. The front wall has a ring-shaped portion 23 and a so-called center section 13 which is defined by a deep depression 27 which, seen in the axial direction, is surrounded by the portion 23. The portion 23 is contacted by an occupant O and serves for restraining. In the mounted state, the restraint device is arranged pivoted about 90° in the clockwise direction. The center section 13 is permanently fastened to the gas bag module by a fastening device, so that it can not move outwards towards the occupant like the rest of the gas bag on unfolding. Thereby, an annular gas bag chamber 29 is produced, into which gas is blown. However, in the inflated state, the depression 27 does not have to be continuously open, rather it can also be closed in parts by opposite wall sections of the gas bag lying against each other. Gas does not flow from the gas bag chamber 29 into the depression 27.

The center section 13 of the gas bag wall is gripped between the module covering 19 (see FIG. 2) and the upper end wall of the gas generator 5. A reinforcement insert in the form of a metal sheet 41, integrated into the module covering and encased by foaming, serves as fastening device; this metal sheet has been encased by foaming during manufacture of the module covering 19, or for example has been encased in a thermoplastic material by injection-molding, so that the foam or injection-molded casing forms the covering 19. Holding pieces in the form of latching bolts or threaded bolts 43, connected with the metal sheet 41, which are fastened to the gas generator 5 project from the module covering 19. The left hand bolt 43' is a latching bolt, and the right hand bolt 43" is a threaded bolt.

Figure 2:
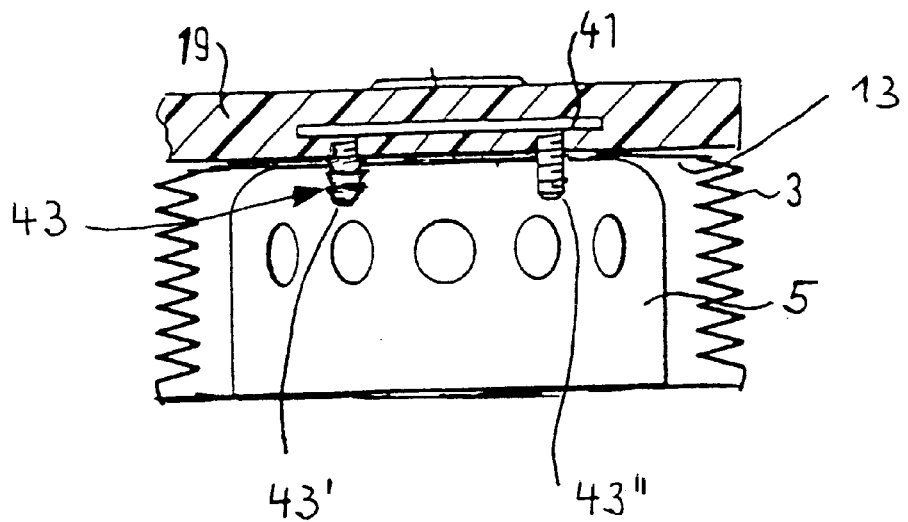
FIG. 2 shows an enlarged view of the device shown in FIG. 1 in the region of the gas generator, with the module closed.
Figure 3:
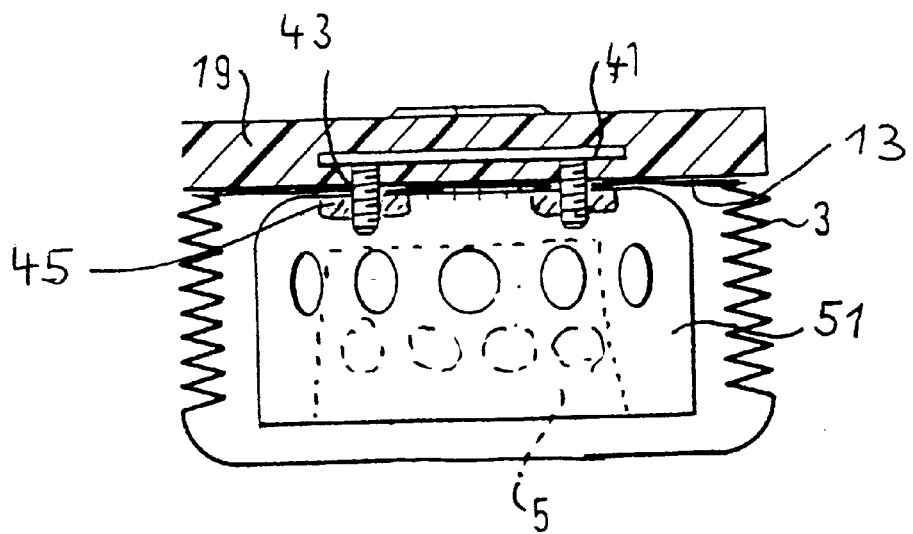
FIG. 3 shows a view corresponding to FIG. 2 of a slightly modified embodiment.

The embodiment according to FIG. 3 corresponds substantially to the one shown in FIG. 2, however with a cup-shaped diffusor 51, which forms a component surrounding the gas generator 5 and rigidly fastened to the module, being turned over the gas generator 5, to which component the threaded bolts 43 are bolted by nuts 45. The center section 13 is therefore gripped between the module covering 19 and the end wall of the diffusor 51.

On unfolding of the gas bag, the latter tears open the module covering 19 (see FIG. 1), so that an annular outlet opening 53 is produced, via which the gas bag leaves the module. The center section 13 is prevented from a movement by the fastening device, so that the depression 27 results.

Figure 4A:
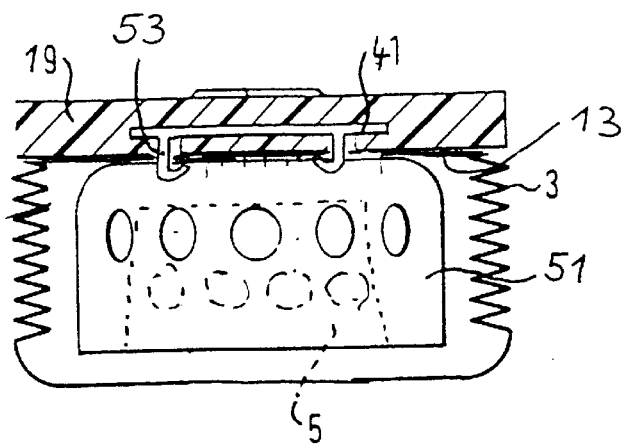
FIGS. 4a to 4c show views corresponding to FIG. 2 of three slightly modified embodiments.
Figure 4B:
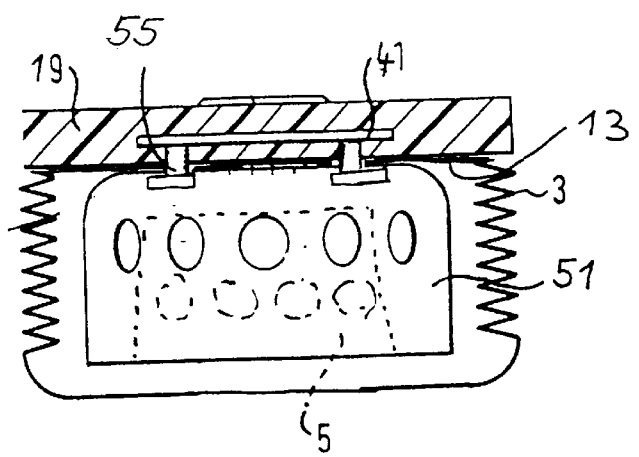
Figure 4C:
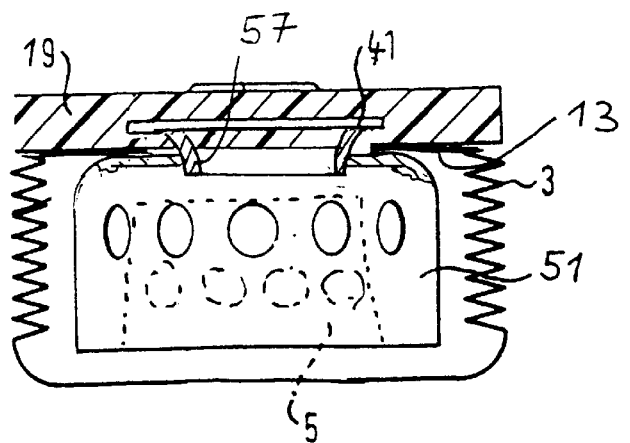

The holding piece may be a protruding sheet metal tongue 53 (FIG. 4a) deformed on its free end, a rivet bolt 55 (FIG. 4b) tumble-riveted or a section of a bayonet closure 57 (FIG. 4c) wherein the diffuser 51 has a corresponding counteropening.

The gas bag, which preferably extends obliquely radially outwards, has good restraining values for the occupant.

What is claimed is:

1. A gas bag restraint device for restraining an occupant, said device comprising
   a gas bag module, which has a gas generator and a gas bag with a gas bag wall, said gas bag wall having a front wall facing said occupant, which front wall has a center section with a depression, in relation to an inflated state of said gas bag, so that an annular gas bag chamber surrounding said depression is formed,
   a module covering which on inflation of said gas bag opens an outlet opening, and
   a fastening device for said center section, with which said center section is prevented from a free movement out of said gas bag module even in said inflated state of said gas bag, so that said depression is formed,
   said fastening device comprising a reinforcement insert embedded into said module covering and at least one fastener for fastening the reinforcement insert to said gas bag module.

2. The gas bag restraint device according to claim 1, wherein said reinforcement insert is a metal sheet.

3. The gas bag restraint device according to claim 2, wherein at least one holding piece, which protrudes from said module covering, projects from said reinforcement insert of said sheet metal.

4. The gas bag restraint device according to claim 3, wherein said holding piece is a threaded bolt, a sheet metal tongue, a rivet bolt or a section of a bayonet closure.

5. The gas bag restraint device according to claim 1, wherein said reinforcement insert is fastened to said gas generator and said center section is gripped between said front end wall of said gas generator and said module covering.

6. The gas bag restraint device according to claim 1, wherein said reinforcement insert is fastened to a component surrounding said gas generator and said center section is gripped between a front end wall of said component and said module covering.

7. The gas bag restraint device according to claim 6, wherein said component is a cup-shaped diffuser which is turned over said gas generator.

8. A gas bag restraint device for restraining an occupant, said device comprising
   a gas bag module, which has a gas generator and a gas bag with a gas bag wall, said gas bag wall having a front wall facing said occupant, which front wall has a center section with a depression, in relation to an inflated state of said gas bag, so that an annular gas bag chamber surrounding said depression is formed,
   a module covering which on inflation of said gas bag opens an outlet opening, and
   a fastening device for said center section, with which said center section is prevented from a free movement out of said gas bag module even in said inflated state of said gas bag, so that said depression is formed,
   said fastening device comprising a reinforcement insert integrated into said module covering and fastened to said gas bag module,
   said module covering being formed by one of a foam casing and injection molded casing, said reinforcement insert being encased by one of the foam casing and injection molded casing into said module covering when formed.

9. The gas bag restraint device according to claim 8, wherein said reinforcement insert is a metal sheet.

10. The gas bag restraint device according to claim 9, wherein at least one holding piece, which protrudes from said module covering, projects from said reinforcement insert of said metal sheet.

11. The gas bag restraint device according to claim 10, wherein said holding piece is a threaded bolt, a sheet metal tongue, a rivet bolt or a section of a bayonet closure.

12. The gas bag restraint device according to claim 8, wherein said reinforcement insert is fastened to said gas generator and said center section is gripped between said front end wall of said gas generator and said module covering.

13. The gas bag restraint device according to claim 8, wherein said reinforcement insert is fastened to a component surrounding said gas generator and said center section is gripped between a front end wall of said component and said module covering.

14. The gas bag restraint device according to claim 13, wherein said component is a cup-shaped diffuser which is turned over said gas generator.

* * * * *